Sept. 30, 1958 A. J. STEPHENS 2,854,287
HUB CAPS FOR OIL LUBRICATED WHEELS
Filed Feb. 15, 1957
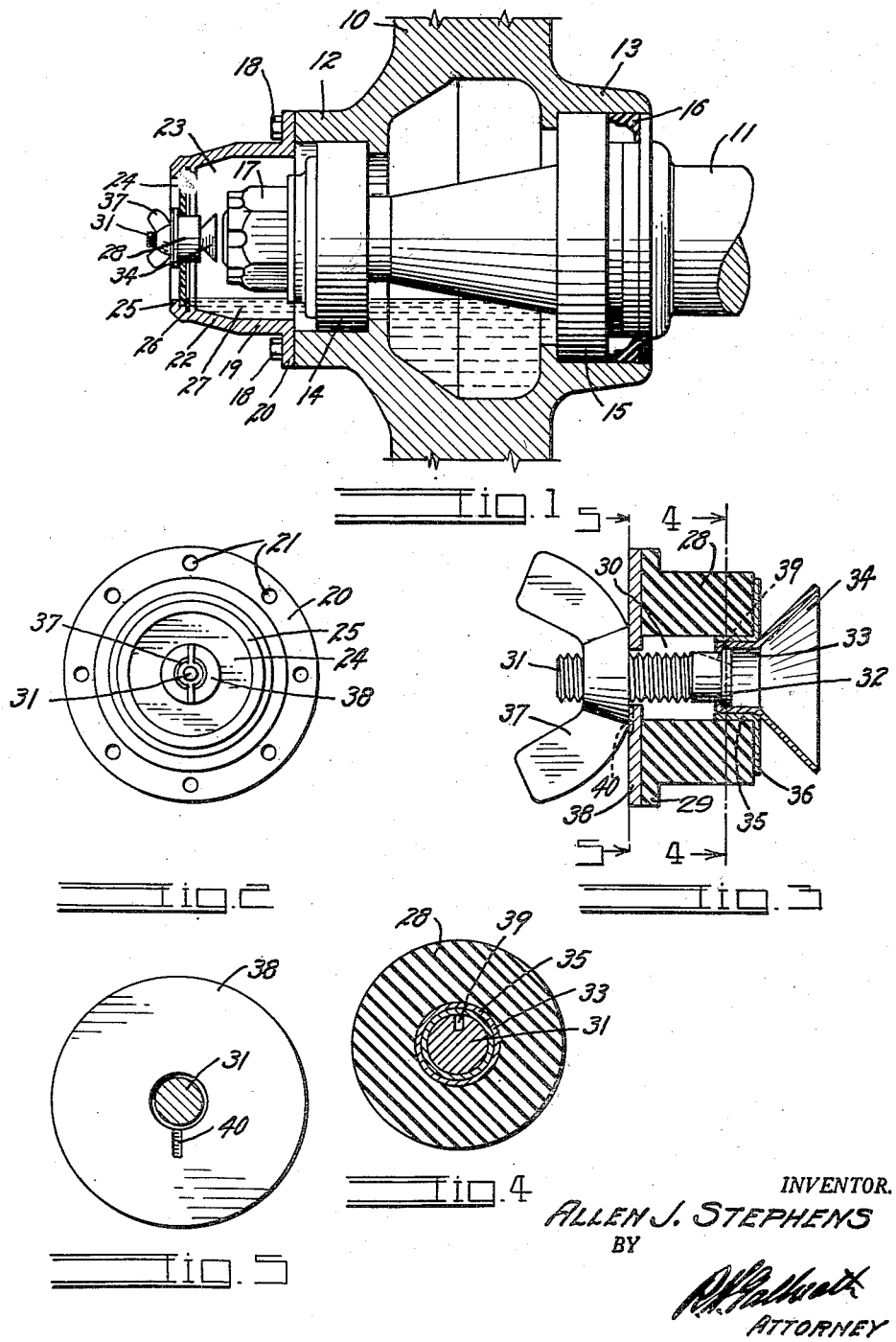
INVENTOR.
ALLEN J. STEPHENS
BY
ATTORNEY

United States Patent Office 2,854,287
Patented Sept. 30, 1958

2,854,287
HUB CAPS FOR OIL LUBRICATED WHEELS
Allen J. Stephens, Denver, Colo.

Application February 15, 1957, Serial No. 640,551

4 Claims. (Cl. 301—108)

This invention relates to a hub cap for vehicle wheels of the type in which the wheel bearing is oil lubricated. Such caps are usually provided with an oil filler plug in the side of the cap which is removed to check the quantity of oil and to add additional oil. Such a cap is exceedingly inconvenient in use since the wheel must be rotated to position the plug at the top before the latter can be removed for checking and replenishing.

The principal object of this invention is to provide a hub cap for a wheel of this type which will enable the oil level to be visually checked at all times without the removal of a filler plug and which will enable the filler plug to be removed, at any position of the wheel, without loss of oil.

The present filler plugs for hub caps of the oil retaining type are threaded into the cap. As a result, a wrench is required for removal and insertion and the threads become damaged, clogged and corroded making removal and replacement difficult, especially under adverse weather conditions such as snow, mud and ice.

Another object of the present invention is to provide a filler plug for hub caps of this type which will have no threads; which will not require the use of a tool of any kind; and which can be quickly and easily removed and replaced by hand when desired.

A further object is to provide a breather passage to accommodate penumatic-thermal-expansion in the wheel hub which will reduce the possibility of oil leakage through the breather passage.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a diametric section through the hub portion of a conventional oil-lubricated automotive wheel with an axle in place therein and with the improved hub cap in place thereon;

Fig. 2 is an outer face view of the improved hub cap removed from the wheel;

Fig. 3 is an enlarged longitudinal section through a filler plug used in the improved hub cap;

Fig. 4 is a cross section through the filler plug, taken on the line 4—4, Fig. 3; and Fig. 5 is a similar cross section, taken on the line 5—5, Fig. 3.

In Fig. 1 of the drawing conventional wheel elements are designated by numberal as follows: wheel 10, axle 11, outer wheel hub 12, inner wheel hub 13, outer bearing 14, inner bearing 15, oil sealing ring 16, and axial terminal nut 17.

The improved hub cap is designed to be attached to the outer wheel hub 12 by means of suitable cap screws 18. The hub cap consists of a cylindrical portion 19 provided at its inner extremity with an annular projecting flange 20 provided with screw holes 21 for receiving the cap screws 18. A conically inclined portion 22 joins the cylindrical portion 19 to form an enclosing wall for a cup-like oil chamber 23 of reduced diameter at its outer end.

The outer end of the oil chamber 23 is closed by a circular transparent plastic window 24 which is maintained against an inwardly-extending terminal flange 25 in the outer end of the conically-inclined portion 22 by means of an inset locking ring 26.

In use the hub of the wheel 10 and the oil chamber 23 is maintained filled with oil (indicated at 27) to a level in approximate alignment with the bottom of the window 24. This level can be visually checked through the transparent window 24.

The window 24 is provided at its axis with a round filler plug opening for snugly receiving an expansible plug 28 of rubber or similar compressible expansible material. The plug 28 is formed with an outer peripheral flange 29 which acts as a stop against the outer face of the window 24 and with an axial core opening 30 from which a bolt 31 extends.

A head 32 on the bolt 31 is positioned in and bears against the bottom of a head cup 33 provided with a flaring skirt portion 34. An enclosing sleeve 35 surrounds the head cup 33 and fits snugly within the outer extremity of the core opening 30. A relatively wide peripheral flange 36 is formed on the outer extremity of the sleeve 35 and rests flat against the inner extremity of the plug 28.

A wing nut 37 is threaded upon the bolt 31 and acts against a compression washer 38 which is positioned between the nut 37 and the plug 28 so as to substantially cover the outer face of the latter. The plug is installed in the window 24 by simply sliding the plug 28 into the axial-window-plug-opening until the flange 29 rests against the outer surface of the window. The nut 37 is now tightened upon the bolt 31 to cause the washer 38 and the flared skirt portion 34 to approach each other. The flared skirt portion presses against the cup flange 36 and causes the latter to compress the plug 28 against the washer 38. The axial compression of the plug 28 causes a diametric expansion thereof causing the plug to expand within, and inwardly of, the axial-window-plug-opening in the window 24 to securely lock and seal the filler plug structure therein.

It has been found necessary to provide a breather passage for oil lubricated wheel hubs to prevent thermal expansion from forcing the lubricating oil past the oil sealing ring 16. These breather passages have always been objectionable due to leakage of oil therethrough. This is avoided in the improved wheel hub cap by cutting a breather notch 39 in the shank of the bolt 31, and extending this notch through the head 32 of the bolt as shown in Fig. 4, and by indenting a breather groove 40 in the outer face of the washer to prevent the wing nut 37 from completely sealing the bolt opening in the washer.

It can be seen that when the wheel comes to rest oil will flow down the inner face of the window 24 to the bottom of the oil chamber 23. The oil flowing down the medial portion of the window will be deflected by the flaring skirt portion 34 to the two sides of the core opening 30 and the flare of the skirt will prevent oil from entering the head cup 33. Any oil which may have splashed into the cup will be drawn downwardly by gravity, due to the incline of the skirt, and will drip from the lowest point thereof. Therefore the possibility of oil entering the breather notch 39 is reduced to an absolute minimum. However, should a fragment of an oil drop be drawn through the notch 39, it will be trapped in the relatively large open core opening 30 before reaching the outer groove 40. Therefore, oil breather oil leakage is substantially eliminated.

While the transparent window provides means under usual conditions for showing the oil level in the hub, it is possible, should visibility be not sufficient, to remove the plug 28 and feel the oil level with the finger at any rotative position of the wheel.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A hub cap for an oil-lubricated wheel hub comprising: an oil chamber adapted to be secured to said hub to close the outer face thereof; a transparent window forming the outer wall of said chamber and provided with a plug opening positioned at the axis of said wheel; and expansible plug fitted into said opening; means operable from the exterior of said window and acting to expand said plug within said opening; a continuously open air passage through said plug from said chamber to the atmosphere; and an annular flaring skirt member supported on the inner extremity of said plug about said air passage to direct oil descending by gravity on the inside of said window away from said passage.

2. A hub cap for an oil-lubricated wheel hub comprising: an oil chamber adapted to be secured to said hub to close the outer face thereof; a transparent window forming the outer wall of said chamber and provided with a plug opening; an expansible plug fitted into said opening; a washer positioned against the outer face of said plug; a bolt extending outwardly through said plug and protruding through said washer; a nut threaded on the outpwardly extending portion of said bolt; a head on said bolt within said plug; a head cup inset in the inner extremity of said plug about said head, the later bearing against the bottom of said cup; a flaring skirt formed about the rim of said cup and projecting inwardly into said chamber; and a flanged sleeve surrounding said cup and bearing against the inner extremity of said plug, said flaring skirt acting against said sleeve when said nut is tightened to compress said plug between the flange on said sleeve and said washer so as to expand said plug in said plug opening.

3. A hub cap as described in claim 2 having an air slot formed in the side of said bolt and on the side of said head and communicating between said cup and the interior of said plug to provide and air passage therein.

4. A hub cap as described in claim 3 having an air groove formed in said washer to form an air passage between said nut and said washer to the interior of said plug.

References Cited in the file of this patent
UNITED STATES PATENTS

| | | |
|---|---|---|
| 624,363 | Moore | May 2, 1899 |
| 715,367 | Giles | Dec. 9, 1902 |
| 966,748 | Honecker | Aug. 9, 1910 |